United States Patent [19]
Simpson et al.

[11] Patent Number: 5,249,707
[45] Date of Patent: Oct. 5, 1993

[54] DISPENSING NOZZLE HAVING A FUEL FLOW INDICATOR

[75] Inventors: W. Dwain Simpson, Wilton; James H. Pyle, Weston, both of Conn.

[73] Assignee: Saber Equipment Corp., Stratford, Conn.

[21] Appl. No.: 895,790

[22] Filed: Jun. 9, 1992

[51] Int. Cl.⁵ .................. B67D 5/38; G01F 15/00; G01P 13/00
[52] U.S. Cl. .................. 222/40; 116/274
[58] Field of Search ............ 222/40; 141/96; 116/273-276; 137/559, 599

[56] References Cited

U.S. PATENT DOCUMENTS

| | | | |
|---|---|---|---|
| 438,396 | 10/1890 | Bellamy | 222/40 X |
| 522,743 | 7/1894 | Siemers | 222/40 X |
| 1,816,470 | 7/1931 | Courtenay, Jr. | 222/40 |
| 1,887,276 | 11/1932 | Munday | 222/40 X |
| 1,946,275 | 2/1934 | Collins | 116/274 X |
| 1,984,630 | 12/1934 | Carlson | 222/40 X |
| 2,139,148 | 12/1938 | Brouse | 116/274 |
| 2,219,677 | 10/1940 | Benzin | 116/274 |
| 2,340,859 | 2/1944 | Bechtold | 222/40 |
| 2,549,276 | 4/1951 | Wolfe | 116/274 |
| 2,836,142 | 5/1958 | Ainsworth | 116/274 |
| 3,185,128 | 5/1965 | Moore et al. | 116/274 |
| 4,745,877 | 5/1988 | Chang | 116/274 |
| 4,993,460 | 2/1991 | Robinson et al. | 116/273 X |
| 5,012,840 | 5/1991 | Betzler | 222/40 X |

FOREIGN PATENT DOCUMENTS 0215631 3/1987 European Pat. Off. ............ 222/40

Primary Examiner—Kevin P. Shaver
Attorney, Agent, or Firm—Gottlieb, Rackman & Reisman

[57] ABSTRACT

A fuel flow indicator for use in a nozzle of a fuel dispensing system. A small percentage of the fuel flowing through the nozzle is diverted to a chamber and used to power rotation of a light deflecting member which is viewable to the user through a glass plate installed on the fuel dispensing nozzle.

6 Claims, 2 Drawing Sheets

DISPENSING NOZZLE HAVING A FUEL FLOW INDICATOR

TECHNICAL FIELD

This invention relates to fuel dispensing nozzles, and more particularly, to an improved fuel flow indicator which may be installed within the fuel dispensing nozzle.

DESCRIPTION OF THE PRIOR ART

Environmental awareness has increased greatly in recent years. Many large companies are currently promoting their products by emphasizing through advertisements that such products are environmentally safe. The art of fuel dispensing systems, especially in self-service stations, is no exception.

Clean burning fuel is substantially free of impurities and is typically extremely clear in appearance. Many fuel companies consider it a major selling point to constantly demonstrate to the consumer that the fuel being dispensed from a fuel dispensing nozzle is perfectly clear and therefore, environmentally safe.

One prior system known to the inventors hereof teaches an arrangement for achieving such a function. The known arrangement includes a plurality of lightweight spheres installed within the line of flow of the fuel. The flow of fuel disturbs these spheres from their rest position and causes a random motion of the spheres. The randomly moving spheres indicate to the user, who can see them through a window in the flow path, that fuel is flowing although the fuel itself is difficult to see because of its extremely clear appearance. This arrangement emphasizes how clear the fuel is each time the user sees the spheres moving.

There are several drawbacks of the arrangement. First, the spheres are located between the pump and the release valve of the nozzle, i.e., in the high pressure portion of the system. Second, the entire flow of fuel is utilized to move the spheres. Both of these facts result in a rather dangerous system which requires extremely accurate connections and plumbing in order to avoid leaks.

It would be desirable therefore to provide a simple technique for emphasizing to the user, each time fuel is dispensed, the extreme purity, clarity and environmental safeness of the fuel. No system for achieving such a result is known in the prior art.

SUMMARY OF THE INVENTION

The above and other problems of the prior art are overcome in accordance with the present invention which relates to an improved fuel flow indicator for use in conjunction with a fuel dispensing nozzle at a point after the fuel passes the release valve. In accordance with the invention, a first auxiliary channel is inserted into the main fuel flow channel within the fuel dispensing nozzle. The auxiliary channel taps off a small percentage of the fuel flow and diverts it into a separate chamber installed within the fuel dispensing nozzle. A second auxiliary channel is arranged to return the small amount of fuel from the separate chamber back into the main fuel flow channel. As fuel flows through the main fuel flow channel, a small percentage is diverted to the chamber and then returned to the main fuel flow channel. The entrance to and exit from the chamber are arranged to cause rotation of a light-deflecting member within the chamber as fuel flows.

In operation, as fuel flows, the rotating member spins and reflects light; in the process, it simulates the flow of fuel. The rotating member may be fluorescent or of some other pleasing appearance, so that it catches the user's eye. The member rotates and disperses light although it does not appear to be powered by flowing fuel since the fuel is completely clear. The rotating member is viewable directly from the top of the nozzle and is thus more likely to be noticed by the user.

BRIEF DESCRIPTION OF THE DRAWINGS

FIG. 3 is a top view of the fuel flow indicator;

FIG. 4 depicts an alternative embodiment of the fuel flow indicator as installed in a nozzle.

DETAILED DESCRIPTION OF THE PREFERRED EMBODIMENT

Figure 1:
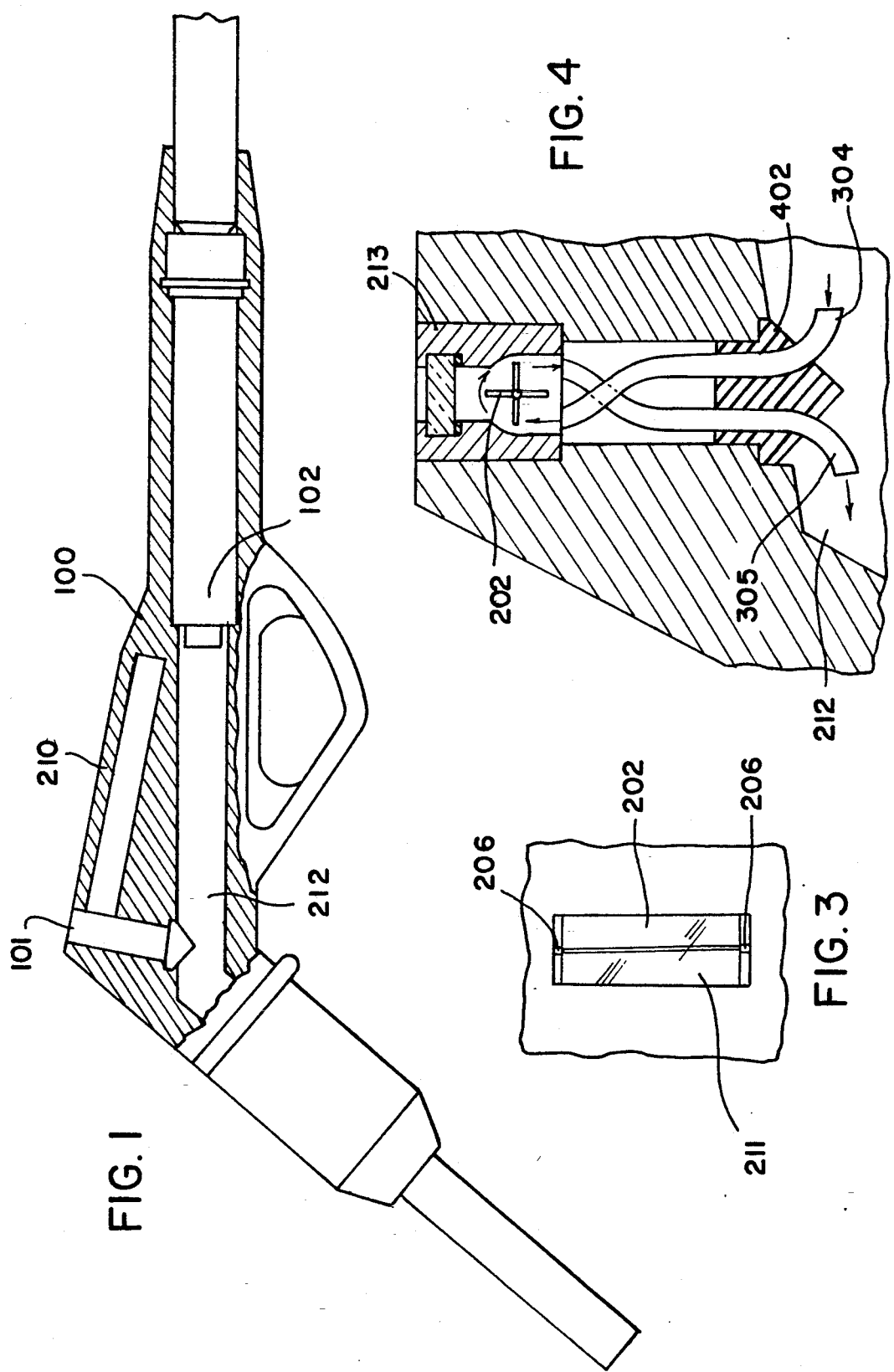
FIG. 1 depicts the fuel flow indicator as installed in a fuel dispensing nozzle.

FIG. 1 is a cross section of a fuel dispensing nozzle showing the placement of fuel flow indicator 101 within nozzle 100. As can be seen from FIG. 1, a portion of the fuel flow indicator is in contact with the flow of fuel through flow channel 212. The fuel flow indicator is installed in the nozzle at a point after the fuel has passed release valve 102. The fuel passing the fuel flow indicator is therefore at a relatively low pressure when compared with the fuel pressure on the pump side of the release valve 102.

Figure 2:
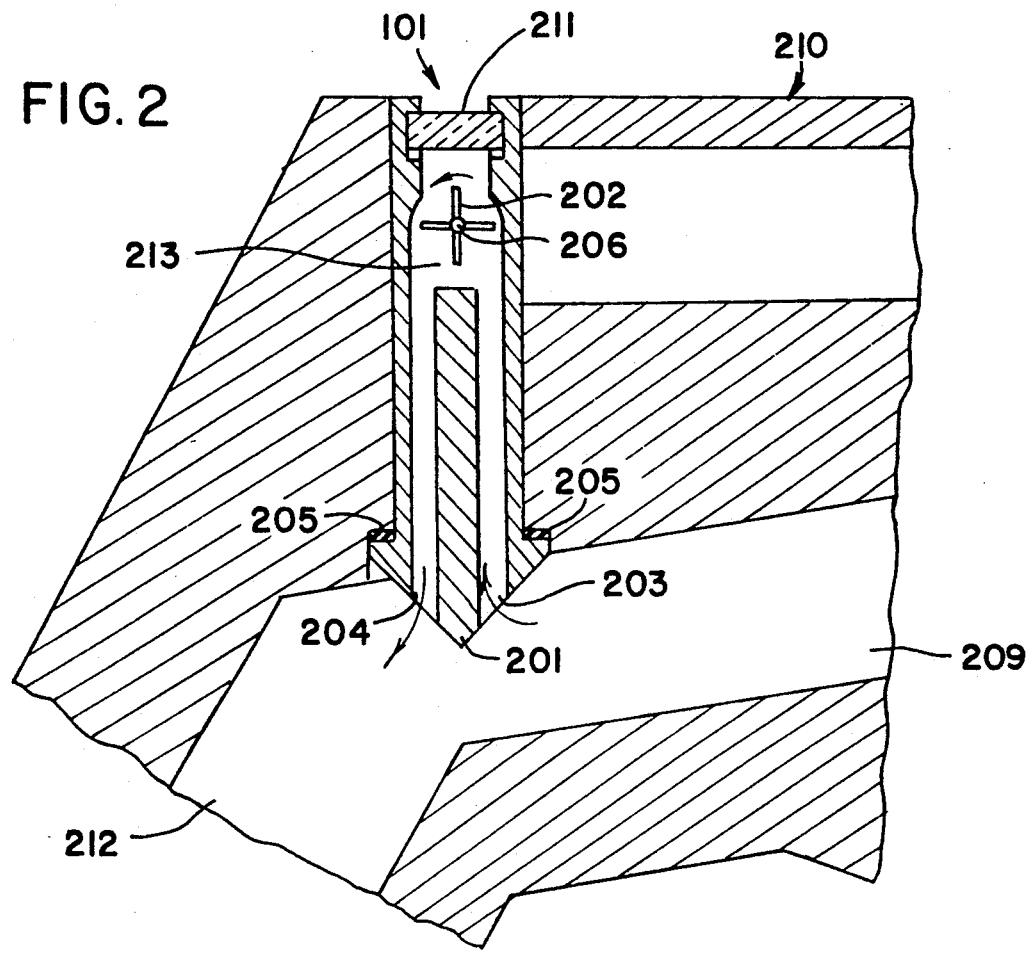
FIG. 2 is a close-up view of the fuel flow dispenser as installed in a nozzle.

FIG. 2 shows, in more detail, a cross section of a portion of a fuel dispensing nozzle incorporating the invention. FIG. 2 comprises a sealing connector 205, which connects chambers 203 and 204 of fuel flow indicator 101 to the main fuel channel 212. A rotating member 202 is held in place by pin 206 which attaches the rotating member 202 to the outer walls of chamber 213.

In operation, fuel flows from right to left in main fuel channel 212. As the fuel flows therethrough, a small percentage of the fuel enters entrance cavity 203 and is diverted up to chamber 213. The diverted fuel enters on the right side of chamber 213. After chamber 213 becomes full the fuel flow within main fuel channel 212 continues to force fuel into chamber 213. The diverted fuel then begins to flow back out exit cavity 204 and returns to the main fuel flow channel 212. It can be appreciated that the diverted fuel entering chamber 213 and exiting therefrom causes a whirlpool in a counterclockwise direction within said chamber. This whirlpool is of sufficient force to rotate member 202 about its axis 206.

Ideally, 202 should be made of a semi-fluorescent or brightly colored material. The material, when rotated, is extremely eye-catching and will lead the consumer very much to appreciate how crystal clear is the fuel being dispensed. The light scattered from rotating member 202 may be viewed by the consumer through glass plate 211 installed at the top of the nozzle as shown in FIG. 2.

FIG. 3 shows a top view of chamber 213 with rotating member 202 installed therein. Pin 206 is seen to attach rotating member 202 to the walls of chamber 213. The surface area and weight of rotating member 202 is chosen such that the force provided by the flowing diverted fuel is sufficient to power rotating member 202. Optionally, rotating member 202 may contain additional fins so that more surface area is provided to react to the force of the flowing diverted fuel.

Another embodiment of the present invention is shown in FIG. 4. The operation of the arrangement of FIG. 4 is similar to that of FIG. 2 except that the technique used to divert the fuel flow into the chamber with rotatable member 202 is different. Specifically, a plug 402 including two openings therethrough is inserted into the main fuel flow path 212. Entry cavity 404 and exit cavity 405 actually cross as shown in FIG. 4.

Figure 5:
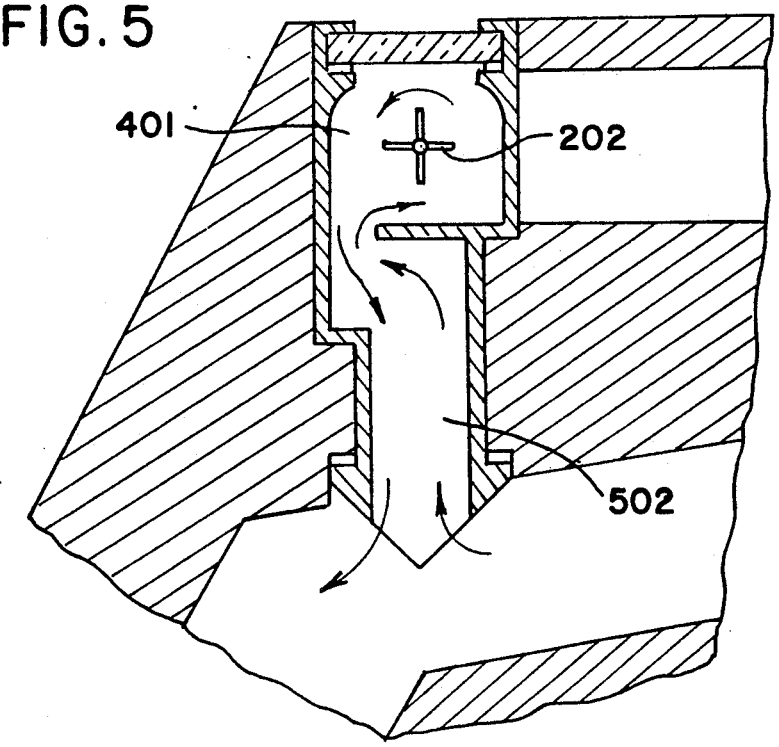
FIG. 5 is a third embodiment of the invention.

FIG. 5 shows a portion of a still further embodiment of the present invention. The arrangement of FIG. 5 may be connected to the main fuel flow channel 212 in a similar manner to that shown in FIGS. 3 and 4. The important distinction in the arrangement of FIG. 5 is that one cavity 502 is used to both divert the fuel from the main fuel channel and return the flow of fuel thereto. The whirlpool effect is created by the shape of channel 502 in conjunction with chamber 501 as can be appreciated from FIG. 5. It can be seen that as the diverted fuel enters chamber 501 it will create a whirlpool in a clockwise direction, thereby rotating member 202.

The above describes the preferred embodiments of the invention however, it will be apparent to those of ordinary skill in the art that various modifications and/or additions may be made to the invention without violating the spirit or scope thereof. Different types of light deflecting members 202 may be used, and various types of arrangements for diverting the fuel to the chamber will also suffice.

We claim:

1. A fuel dispensing nozzle comprising
a release valve;
a main fuel flow channel;
a chamber adjacent to said main fuel flow channel and having a window therein;
an elongated rotatable member mounted transversely within said chamber, said rotatable member being entirely visible through said window; and
means for diverting fuel flow from said main fuel flow channel to the chamber and for causing said diverted fuel flow to move said rotatable member, said means for diverting being installed to divert fuel after said fuel has passed said relapse valve.

2. A fuel dispensing nozzle according to claim 1 wherein said rotatable member includes a plurality of fins.

3. The fuel dispensing nozzle of claim 1 wherein said rotatable member is comprised of a fluorescent plastic.

4. The fuel dispensing nozzle of claim 3 wherein said window is a transparent glass covering said chamber so that said rotatable member is viewable therethrough.

5. The fuel dispensing nozzle of claim 4 wherein said means for diverting includes a first cavity for allowing fuel to flow to said chamber; and
a second cavity for returning said fuel to said main fuel flow channel.

6. A fuel dispensing nozzle according to claim 4 wherein said means for diverting includes only one cavity arranged between said main flow of fuel and said chamber, said one cavity diverting fuel to said chamber and returning fuel to said main fuel flow channel from said chamber and wherein the entire rotatable member is contained within said chamber.

* * * * *